United States Patent
Rath et al.

(10) Patent No.: US 8,337,686 B2
(45) Date of Patent: Dec. 25, 2012

(54) ELECTROREGENERATION APPARATUS AND WATER TREATMENT METHOD

(75) Inventors: David F. Rath, Dundas (CA); Christopher L. Hansen, Newbury, OH (US); Lyle Edward Kirman, Cleveland Heights, OH (US); Christopher S. Putka, Cleveland, OH (US); James E. Bolton, Burlington (CA)

(73) Assignee: Kinetico Incorporated, Newbury, OH (US)

( * ) Notice: Subject to any disclaimer, the term of this patent is extended or adjusted under 35 U.S.C. 154(b) by 82 days.

(21) Appl. No.: 12/445,848

(22) PCT Filed: Apr. 23, 2008

(86) PCT No.: PCT/US2008/005195
§ 371 (c)(1),
(2), (4) Date: Apr. 16, 2009

(87) PCT Pub. No.: WO2009/051612
PCT Pub. Date: Apr. 23, 2009

(65) Prior Publication Data
US 2011/0042214 A1 Feb. 24, 2011

Related U.S. Application Data

(63) Continuation-in-part of application No. PCT/US2007/022204, filed on Oct. 18, 2007.

(60) Provisional application No. 60/852,510, filed on Oct. 18, 2006.

(51) Int. Cl.
*B01D 61/44* (2006.01)
*B01D 61/48* (2006.01)

(52) U.S. Cl. ........ 204/536; 204/537; 204/631; 204/632; 205/747; 205/748

(58) Field of Classification Search .................. 204/537, 204/631, 632, 536; 205/744, 747, 748
See application file for complete search history.

(56) References Cited

U.S. PATENT DOCUMENTS
2,980,598 A 4/1961 Stoddard
(Continued)

FOREIGN PATENT DOCUMENTS
GB 906440 9/1962
(Continued)

OTHER PUBLICATIONS

Written Opinion of the International Searching Authority issued in corresponding International Application No. PCT/US2008/005195.
(Continued)

*Primary Examiner* — Keith Hendricks
*Assistant Examiner* — Steven A. Friday
(74) *Attorney, Agent, or Firm* — Pearne & Gordon LLP

(57) ABSTRACT

A water treatment apparatus that includes a cation exchange chamber containing a cation exchange resin and an anion exchange chamber containing an anion exchange resin. A bipolar interface is located between the resin chambers and defines a zone of water disassociation. A cathode communicates with the cation exchange chamber through a cation exchange membrane. An anode communicates with the anion exchange chamber through an anion exchange membrane. Dilution or flushing water flows through cathode and anode chambers and conveys captured ions to a drain or other waste connection. A baffle may be used in some configurations to divide a resin chamber into an exhausted resin region and a regenerated resin region and causes incoming water to flow through the exhausted resin region first. The exhausted resin region is located near its associated electrode, thus improving the electrical efficiency of the cell. In an alternate design, the apparatus includes a cathode/anode chamber, an anode chamber and an auxiliary electrode chamber disposed between the cathode/anode chamber and a cation exchange media chamber. An anion exchange membrane separates the cathode/anode chamber from the auxiliary electrode chamber. The anode chamber, cathode/anode chamber and auxiliary electrode chamber are energized in predetermined sequences to create both service cycles which produce softened water with reduced ionic content and cleaning cycles to de-scale the auxiliary electrode chamber and/or anion exchange membrane located between the cathode/anode chamber and the auxiliary electrode chamber.

34 Claims, 7 Drawing Sheets

U.S. PATENT DOCUMENTS

| | | | |
|---|---|---|---|
| 3,149,061 A | 9/1964 | Parsi | |
| 3,341,441 A * | 9/1967 | Giuffrida et al. | 204/525 |
| 3,562,433 A | 2/1971 | Ambrosio | |
| 4,032,452 A | 6/1977 | Davis | |
| 4,062,756 A | 12/1977 | Jha et al. | |
| 4,067,794 A | 1/1978 | Ganzi et al. | |
| D248,157 S | 6/1978 | Ganzi et al. | |
| 4,465,573 A | 8/1984 | O'Hare | |
| 4,632,745 A | 12/1986 | Giuffrida et al. | |
| 4,687,561 A | 8/1987 | Kunz | |
| 4,747,929 A | 5/1988 | Siu et al. | |
| 4,871,431 A | 10/1989 | Parsi | |
| 4,925,541 A | 5/1990 | Giuffrida et al. | |
| 4,964,970 A | 10/1990 | O'Hare | |
| 4,969,983 A * | 11/1990 | Parsi | 204/524 |
| 5,032,265 A | 7/1991 | Jha et al. | |
| 5,154,809 A | 10/1992 | Oren et al. | |
| 5,211,823 A | 5/1993 | Giuffrida et al. | |
| 5,240,579 A | 8/1993 | Kedem | |
| 5,259,936 A | 11/1993 | Ganzi | |
| 5,316,637 A | 5/1994 | Ganzi et al. | |
| 5,423,965 A | 6/1995 | Kunz | |
| 5,427,667 A | 6/1995 | Bakhir et al. | |
| 5,540,819 A | 7/1996 | Bakhir et al. | |
| 5,593,563 A * | 1/1997 | Denoncourt et al. | 204/524 |
| 5,736,023 A | 4/1998 | Gallagher et al. | |
| 5,788,826 A | 8/1998 | Nyberg | |
| 5,858,191 A * | 1/1999 | DiMascio et al. | 204/524 |
| 5,954,935 A | 9/1999 | Neumeister et al. | |
| 6,056,878 A | 5/2000 | Tessier et al. | |
| 6,149,788 A | 11/2000 | Tessier et al. | |
| 6,248,226 B1 | 6/2001 | Shinmei et al. | |
| 6,274,018 B1 | 8/2001 | Hidaka | |
| 6,280,599 B1 | 8/2001 | Osvath et al. | |
| 6,284,124 B1 | 9/2001 | DiMascio et al. | |
| 6,296,751 B1 | 10/2001 | Mir | |
| 6,379,518 B1 * | 4/2002 | Osawa et al. | 204/634 |
| 6,416,645 B1 | 7/2002 | Sampson et al. | |
| 6,471,867 B2 | 10/2002 | Sugaya et al. | |
| 6,514,398 B2 | 2/2003 | DiMascio et al. | |
| 6,596,145 B2 | 7/2003 | Moulin et al. | |
| 6,607,647 B2 | 8/2003 | Wilkins et al. | |
| 6,649,037 B2 | 11/2003 | Liang et al. | |
| 6,726,822 B2 | 4/2004 | Garcia et al. | |
| 6,733,646 B2 | 5/2004 | Sato et al. | |
| 6,808,608 B2 | 10/2004 | Srinivasan et al. | |
| 6,824,662 B2 | 11/2004 | Liang et al. | |
| 6,843,895 B2 | 1/2005 | Bakir et al. | |
| 7,033,472 B2 | 4/2006 | Yamanaka et al. | |
| 7,083,733 B2 | 8/2006 | Freydina et al. | |
| 7,247,225 B2 | 7/2007 | Miwa et al. | |
| 7,279,083 B2 | 10/2007 | Emery et al. | |
| 7,329,358 B2 | 2/2008 | Wilkins et al. | |
| 7,338,600 B2 | 3/2008 | Chidambaran et al. | |
| 7,427,342 B2 | 9/2008 | Barber | |
| 7,459,088 B2 | 12/2008 | Davis | |
| 7,470,366 B2 | 12/2008 | Queen et al. | |
| 7,481,929 B2 | 1/2009 | Wilkins et al. | |
| 7,563,351 B2 | 7/2009 | Wilkins et al. | |
| 7,572,359 B2 | 8/2009 | Liang et al. | |
| 7,582,198 B2 | 9/2009 | Wilkins et al. | |
| 7,604,725 B2 | 10/2009 | Ganzi et al. | |
| 2002/0139676 A1 | 10/2002 | Moulin et al. | |
| 2003/0089609 A1 | 5/2003 | Liang et al. | |
| 2004/0188258 A1 * | 9/2004 | Takahashi et al. | 204/537 |
| 2004/0206627 A1 | 10/2004 | Bejtlich, III et al. | |
| 2005/0098436 A1 | 5/2005 | Miwa et al. | |
| 2005/0103622 A1 | 5/2005 | Jha et al. | |
| 2005/0103630 A1 | 5/2005 | Ganzi et al. | |
| 2005/0103631 A1 | 5/2005 | Freydina et al. | |
| 2005/0103644 A1 | 5/2005 | Wilkins et al. | |
| 2005/0103717 A1 | 5/2005 | Jha et al. | |
| 2005/0103722 A1 | 5/2005 | Freydina et al. | |
| 2005/0103723 A1 | 5/2005 | Wilkins et al. | |
| 2005/0103724 A1 | 5/2005 | Wilkins et al. | |
| 2005/0263457 A1 | 12/2005 | Wilkins et al. | |
| 2006/0157422 A1 | 7/2006 | Freydina et al. | |
| 2006/0231403 A1 | 10/2006 | Riviello | |
| 2008/0067069 A1 | 3/2008 | Gifford et al. | |

FOREIGN PATENT DOCUMENTS

WO      2005042808      5/2005

OTHER PUBLICATIONS

PCT/US07/22204 International Search Report; Published Apr. 24, 2008.

PCT/US08/05195 International Search Report; International Filing Date Apr. 23, 2008.

Information Disclosure Statement (Filed on Jun. 30, 2006) in U.S. Appl. No. 11/105,136, entitled "Regeneration of Adsorption Media Within Electrical Purification Apparatuses" filed Apr. 13, 2005 (Now abandoned).

* cited by examiner

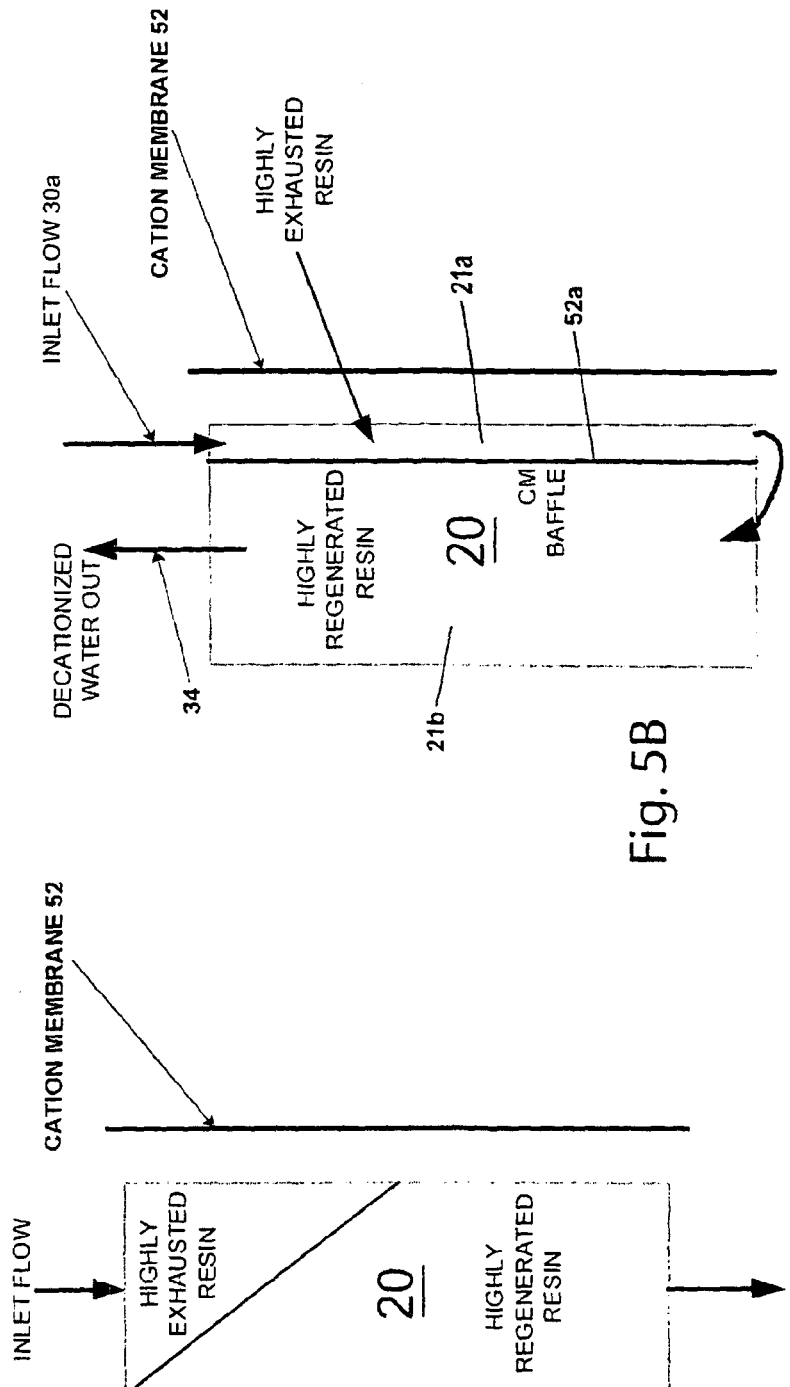

ELECTROREGENERATION APPARATUS AND WATER TREATMENT METHOD

CROSS REFERENCES TO RELATED APPLICATIONS

This application filed under 35 U.S.C §371 is a national phase application of International Application Serial Number PCT/US2008/05195 filed Apr. 23, 2008 which is a continuation-in-part and claims priority to PCT/US07/022,204, filed Oct. 18, 2007, which claims priority to U.S. Provisional Application 60/852,510 filed Oct. 18, 2006.

FIELD OF THE INVENTION

The present invention relates generally to water treatment processes and in particular to a method and apparatus for removing cations and anions from water using ion exchange resins and membranes and using electricity to regenerate the resins.

BACKGROUND ART

There are many methods and apparatus disclosed in the prior art for removing minerals from water. A water softening apparatus such as that disclosed in U.S. Pat. No. 3,891,552 is an example of a water treatment system that is used to remove certain "hard" ions in order to produce softened water. When substantially all of the ion sites in the water softening resin hold a "hard" ion, the resin must be regenerated. In a typical water softener of the "ion exchange" type, a resin tank containing a water softening resin is utilized. In particular, the "hard" water is passed through the resin tank where the water exchanges its "hard" ions of calcium, magnesium, etc. for "soft" sodium or potassium ions located at the resin ion exchange sites. The resin is selected to have a greater affinity for the calcium and magnesium ions and thus releases the sodium or potassium ions in favor of the calcium and magnesium ions carried by the water.

The AWWA in their Handbook, Water Quality and Treatment (published by the American Water Works Association, fourth edition, 1990, pages 657 and 658), says "Hardness in natural water is caused by the presence of any polyvalent metallic cation . . . . Because the most prevalent of these species are the divalent cations of calcium and magnesium, total hardness is typically defined as the sum of the concentrations of these two elements and is usually expressed in terms of milligrams per liter as $CaCO_3$."

Table 10.4 on page 658 of this reference lists the following.

| Hardness Range (mg/L as $CaCO_3$) | Hardness Description |
|---|---|
| 0-75 | Soft |
| 75-150 | Moderately Hard |
| 150-300 | Hard |
| >300 | Very Hard |

In a conventional water softener, a brine solution is flushed through the resin bed to regenerate the resin. The high concentration of sodium or potassium ions in the brine solution forces the resin bed to release the calcium and magnesium ions which are discharged to a drain. At the end of the regeneration cycle, the ion exchange sites in the resin bed each hold sodium or potassium ions. The regeneration cycle typically lasts about an hour and needs to be done several times a week. More frequent regenerations may be required in periods of greater than normal water usage. As should be apparent, a water softener of the type described produces a waste stream during regeneration that contains brine. In some locations of the country, the discharge of a brine solution from a water treatment system is restricted or may be prohibited in the future.

Deionization or demineralization systems are also available in the prior art for removing both cations and anions from a water supply. An example of such a deionization system can be found in U.S. Pat. No. 4,427,549. In the disclosed system, separate cation and anion resin tanks are used to remove cations and anions, respectively from the water being treated. The cation and anion tanks contain respective cation and anion exchange resins.

Like the resin tank described above in connection with the water softening apparatus, the resin tanks of the deionization apparatus must be regenerated periodically to flush the captured ions from the resins. In a deionization apparatus of the type disclosed in the '549 patent, the cation resin is regenerated by an acid regeneration solution which drives the cations from the resin bed and replaces them with hydrogen ions ($H^+$). The anion resin is regenerated by an alkaline solution which flushes the anions from the resin bed and replaces them with hydroxyl ions ($OH^-$). In this type of deionization apparatus, two waste streams are produced during regeneration, one being an acid solution, the other being an alkaline solution. A water deionization system where waste streams of this type are eliminated or substantially reduced is desirable.

This desired result has been previously accomplished by using an electrodeionization (EDI) apparatus. Conventional EDI water producing methods as described in U.S. Pat. No. 7,033,472 contain an ion depletion chamber partitioned by a cation exchange membrane on one side and anion exchange membrane on the other side. The depletion chamber is packed with an ion exchange material. Concentrate chambers are provided on both sides of the depletion chamber with the cation exchange membrane and anion exchange membrane in between. The depletion chamber and the concentration chambers are disposed between an anode chamber having an anode and a cathode chamber having a cathode. In many instances, the depletion and concentrating chambers are stacked in multiples to achieve the desired flow rate by having cation exchange membranes and anion exchange membranes, separated from one another, alternately arranged and an ion exchange material filling every other chamber formed by the cation exchange membrane and anion exchange membrane. Ion exchange material may also be in the concentrate chambers as well. Water to be processed is supplied to the depletion chamber while applying a voltage. Concentrate water is sent to a concentrate chamber to remove impurity ions from the water to be processed, whereby deionized water is produced. Another example of an EDI system is disclosed in U.S. Pat. No. 4,871,431.

An EDI apparatus as described in U.S. Pat. No. 6,607,647 describes EDI as a process that removes ionizable species from liquids using electrically active media and an electrical potential to influence ion transport. In EDI the ability of the resin to rapidly transport ions to the surface of the ion exchange membranes is much more important than the ion exchange capacity of the resin. Therefore resins are not optimized for capacity but for other properties that influence transport, such as water retention and selectivity.

Many other commercial EDI systems currently have limitations that prevent the use on typical well and public water sources. Such limitations may include the requirement for softening or reverse osmosis pretreatment methods to prevent scaling that would lead to a device failure, inability to process intermittent flows, and very limited ion exchange reserve capacity. If there is no product water flow then the device cannot regenerate itself as designed. Other similar devices are designed for high purity water production and cannot treat water with high concentrations of ions, making them impractical for normal household use. Therefore a device that could overcome these limitations is desired.

DISCLOSURE OF THE INVENTION

The present invention provides a new and improved water treatment apparatus and method that utilizes electricity to regenerate the cation and anion exchange resin chambers while maintaining a relative scale free environment. It also improves on the current electrochemical device designs by lowering the voltage required, eliminating the requirement of continuous electricity during product water flow and also eliminating the requirement of product water flow when electric potential for the regeneration of the resin chambers is applied.

According to one embodiment of the invention, the water treatment apparatus includes at least one cation exchange chamber and at least one anion exchange chamber that contain respective cation and anion exchange resins. A bipolar interface is located between the cation and anion exchange chambers. A first primary electrode chamber which may comprise a cathode is associated with the cation exchange chamber. The electrode chamber communicates with the cation exchange chamber through a cation exchange membrane. In an illustrated embodiment, the cathode is surrounded by a cation exchange membrane which is located in or adjacent the cation exchange resin chamber.

In one preferred and illustrated embodiment, the apparatus further includes a second primary electrode which may be an anode that is associated with the anion exchange chamber. The second electrode communicates with the anion exchange chamber through an anion exchange membrane and, in a more preferred embodiment, the second electrode (i.e., anode) is surrounded by an anion exchange membrane).

According to a feature of the invention, the bipolar interface can be a bipolar membrane. The bipolar interface defines a zone of water disassociation.

According to another preferred embodiment, the water treatment apparatus is configured in a plate and frame design, and with this configuration, the cathode and anode resin chambers are at least one inch thick. According to another feature of the invention, the water treatment apparatus can be configured in an annular design wherein the membranes, electrodes and chambers are arranged in an annular, layered design.

According to another feature of the invention, the water treatment apparatus may include a baffle which may comprise a cation exchange membrane located within the cation exchange resin chamber. This baffle divides the resin chamber into a highly exhausted resin region and a highly regenerated resin region. When the water treatment apparatus is configured such that the water flow is perpendicular or transverse to the current flow, the baffle improves efficiency. The baffle causes the incoming water to flow initially through the exhausted resin before flowing through the highly regenerated resin. The exhausted resin region is located adjacent or next to the associated electrode, and as a result, virtually all current flow generated by the electrode flows through the exhausted resin before flowing through the region of the chamber where highly regenerated resin is still present.

With the disclosed apparatus, a compact and efficient design is provided. The design, unlike the prior art, does not require multiple cation and anion exchange resin chambers in a given cell.

In another preferred embodiment of the invention, a cell with five chambers, three membranes plus bipolar interface configuration and with three electrodes is disclosed as contrasted with the first embodiment (that includes a cell with four chambers, two or three electrodes, and two membranes plus a bipolar interface). The five chamber design is comprised of a first primary electrode chamber which in the illustrated embodiment is a cathode/anode chamber, a second primary electrode chamber which in the illustrated embodiment is an anode chamber, a cation exchange resin chamber containing cation exchange media, an anion exchange resin chamber containing anion exchange media, and a fifth chamber that is an auxiliary electrode chamber that contains an auxiliary electrode that can function as either a cathode or as an anode. The use of and the advantages of the auxiliary electrode in the auxiliary electrode chamber will be described below.

In all variations of this embodiment, the bipolar interface separates the cation exchange resin chamber and the anion exchange resin chamber. The first and second primary electrode chambers and the auxiliary electrode chamber also containing an electrode are separated from each other and the cation and anion exchange resin chambers by ion exchange membranes that are selectively permeable either to cations (positively charged ions) or anions (negatively charged ions), but not both. Each of the chambers that contain an electrode may also contain ion exchange media and also may communicate with a reservoir and recirculation pump. The auxiliary electrode chamber is located either between the anode chamber and the anion exchange resin chamber or between the cathode/anion chamber and the cation exchange resin chamber.

The auxiliary electrode in the auxiliary electrode chamber may be operated in conjunction with the other two electrodes in many different ways. For example, the auxiliary electrode can be operated intermittently with the cathode/anode in the cathode/anode chamber to create a de-scaling or cleaning cycle for either the auxiliary electrode chamber or the cathode/anode chamber in the following manner. In the first case, during the normal operation cycle, only the primary anode and the primary cathode/anode are energized and the auxiliary electrode is not energized. During the service cycle, the bipolar junction is actively splitting water into $H+$ and $OH-$ ions which regenerate the cation ion exchange media in the cation exchange chamber and the anion exchange media in the anion exchange chamber, respectively, and the ions also move toward the oppositely charged electrodes under the applied electric field. During a de-scaling cycle, which is preferably done frequently enough to prevent any significant hardness scaling on membrane, resin or electrode surfaces, the primary anode is de-energized and the auxiliary electrode is energized as an anode by means of a switching device.

In order to lower the pH of the auxiliary electrode chamber and thereby prevent scaling or to de-scale the auxiliary electrode chamber, the auxiliary electrode is energized as an anode, and the first primary electrode continues to function as a cathode. At the auxiliary electrode, oxygen gas and $H+$ ions are formed The hydrogen ions reduce the pH of the water in the auxiliary electrode chamber, and thereby dissolve any scale that has formed. In order to make this pH change occur rapidly, it is also desirable to reduce or stop the flow of water through the auxiliary electrode chamber when the electrode is energized as an anode.

In order to de-scale the cathode/anode chamber, the auxiliary electrode is energized as a cathode and the first primary cathode is temporarily energized as an anode by means of a switching device. In this way the pH of the water in the cathode/anode chamber is lowered by the $H^+$ ions generated in the chamber and the first primary electrode (energized as a cathode) chamber is de-scaled. The electric field resulting from this operation also results in lowering the pH of the anion membrane surface on the side facing the auxiliary electrode chamber, thereby dissolving or separating any scale that may form at this surface.

During either of the de-scaling cycles described above, the second primary electrode (i.e. an anode) is not energized and there is no electrical potential across the bipolar junction. Accordingly, there is no water splitting or regeneration of the cation exchange media in the cation exchange resin chamber and no regeneration of the anion exchange media in the anion exchange resin chamber during the de-scaling cycles as described above. Since regeneration of the ion exchange media does not occur during the de-scale cycles, it is desirable that the de-scale time interval be as short as possible in relation to the normal service cycle. Cycle times for the normal service cycle and one or more de-scale cycles may be variable and may also be combined with changes to the flow rates through the electrode chambers, and/or changes to the applied current.

While the description above lists only two of the many ways that an auxiliary electrode in an auxiliary electrode chamber can be beneficially cycled, these descriptions are not intended to limit the scope of this invention regarding the ways that this feature can be used, only as two examples of the many different ways which are part of this invention. For example in another variation of this invention, the auxiliary electrode may function as the cathode with the cathode/anode de-energized during normal service without departing from the spirit of this invention.

Additional features of the invention will become apparent and fuller understanding obtained by reading the following detailed description made in connection with the accompanying drawings.

BRIEF DESCRIPTION OF DRAWINGS

FIGS. 5B and 5C are illustrations of the exhaustion patterns of the resin with and without a baffle added to the system, respectively; and, FIG. 6 is a schematic representation of a water treatment system constructed in accordance with another preferred embodiment of the invention;

BEST MODE FOR CARRYING OUT THE INVENTION

Figure 1:
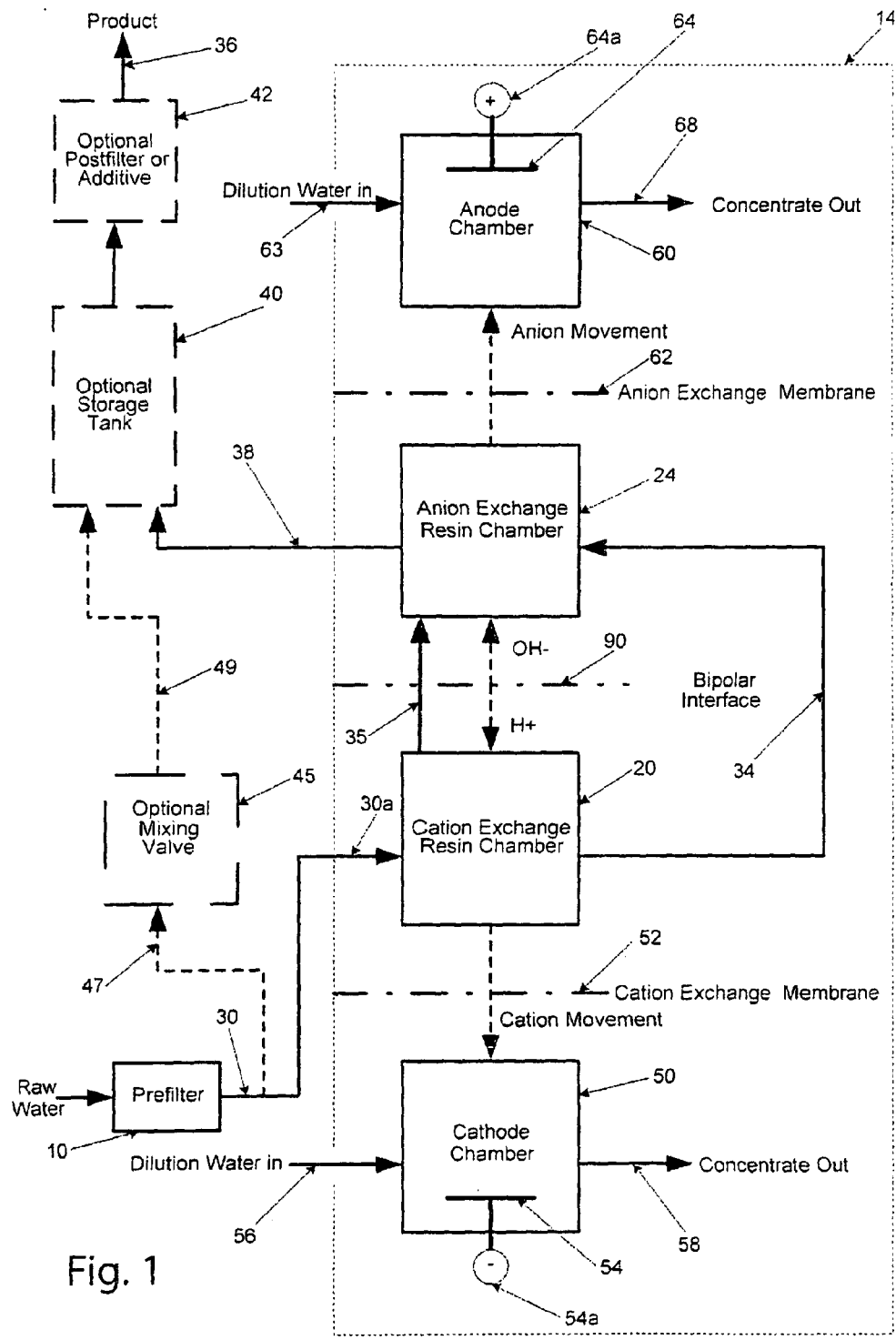
FIG. 1 is a schematic representation of a water treatment system constructed in accordance with one preferred embodiment of the invention.
Figure 2:
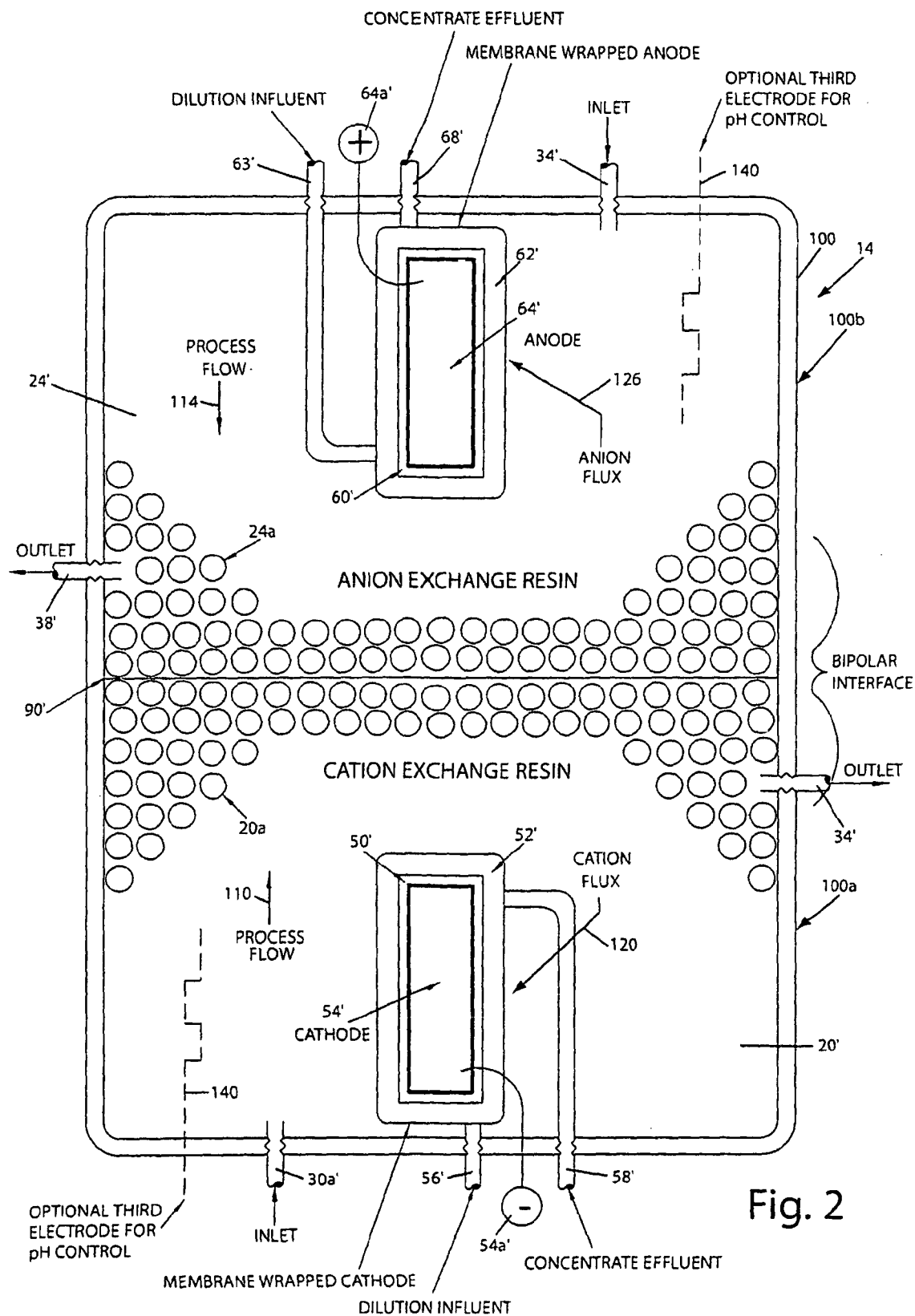
FIG. 2 is a sectional view, shown somewhat schematically, of an electroregeneration water treatment device constructed in accordance with a preferred embodiment of the invention.

FIG. 1 schematically illustrates a water treatment system for removing both cations and anions from a water supply. In the illustrated embodiment, the water to be treated (or raw water) is first fed through a prefilter 10 to remove sediment and other particulates carried by the water. From the prefilter, the water to be treated is conveyed to an electroregeneration deionization cell or vessel indicated by the phantom line 14. The cell 14 includes a cation exchange resin chamber 20 and an anion exchange resin chamber 24 through which the raw water is passed. Referring also to FIG. 2, a cation exchange resin 20a (only shown in FIG. 2) and an anion exchange resin 24a contained within the chambers 20, 24 (shown in FIG. 1), respectively operate to remove some or all of the cations and anions carried by the raw water.

Referring in particular to FIG. 1, filtered raw water is communicated to an inlet of the cation exchange resin chamber 20 via conduit or flow path 30 and branch conduit 30a. As the water flows through the cation exchange resin chamber 20, cations carried by the water such as calcium and magnesium are attracted to, and held within the chamber 20 by the cation exchange resin 20a (shown in FIG. 2). From the resin chamber 20, the decationized water flows to the anion exchange resin chamber 24 via conduit or flow path 34. Alternately, some or all the decationized water may flow into the anion exchange resin chamber 24 via the flow path 35 (as will be further explained). As the decationized water flows through the anion exchange resin chamber 24, the anion resin 24a (shown in FIG. 2) within the chamber 24 attracts anions such as sulfates, chlorides, etc. and removes them from the water traveling through the resin chamber 24. The resulting "deionized" water is then conveyed to a delivery point such as a faucet indicated generally by the reference character 36 via conduit or flow path 38. The flow path 38 may optionally include a storage tank 40 for accumulating deionized water and/or a post treatment device 42. The post treatment device 42 may comprise a post filter such as a carbon filter or a device for adding minerals or chemicals such as fluoride to the deionized water prior to dispensing.

In the above description, the water produced by the apparatus was termed "deionized" water. It should be noted here, that the primary function of the disclosed apparatus is to remove hardness ions from incoming water and do this without requiring pre-treatment of the water to remove certain ions prior to processing as is the case with conventional EDI systems. The disclosed apparatus is effective in producing "softened" water directly from a water supply that has not been pre-treated. Because the apparatus is using an electric potential in its operation, an anode is required to create the required electric field and, as a result, some anions are also removed from the water. However, the apparatus is not intended to produce ion-free or "deionized" water as that term is defined in the water industry.

As seen in FIG. 1, the system may include an optional mixing valve 45 which is used, if desired, to mix filtered raw water with treated water. In particular an optional branch conduit 47 feeds filtered raw water to the mixing valve 45 which can be operated to feed a predetermined amount of raw water via an outlet conduit 49 to the storage tank where the raw water is mixed with treated water.

In the preferred embodiment, the cation exchange resin chamber 20 is separated from a cathode chamber 50 by way of a cation exchange membrane 52. The cathode chamber 50 houses a cathode 54 which is connected to a negative terminal of a direct electrical current power source 54*a*. A flushing and dilution fluid flows through the cathode chamber 50 from an inlet indicated generally by the reference character 56 and flows to a waste conduit 58. In the illustrated embodiment, the flushing and dilution fluid is untreated water from the raw water source.

The anion exchange resin chamber 24 is separated from an anodic electrode chamber 60 via an anion exchange membrane 62. The anode chamber contains an anode 64 connected to a positive terminal of a direct electrical current power source 64*a*. The flushing fluid enters the anode chamber via a conduit 63 and leaves the anode chamber 60 via a waste connection or outlet conduit 68. Both conduits 58 and 68 communicate with a drain or other waste connection. Conduits 58 and 68 may also be joined together and then connected to a drain or other waste connection.

In the preferred and illustrated embodiment, the cation exchange resin chamber 20 and the anion exchange resin chamber 24 are in adjacent fluid communication. According to the illustrated embodiment, an interface between the anion resin chamber and cation resin chamber, indicated generally by the reference character 90 is operative to split water at the interface into hydrogen and hydroxyl ions as illustrated schematically in FIG. 1.

In one embodiment of the invention, the anion and cation resin chambers 20, 24 are separated by a bipolar interface (indicated by the reference character 90). This interface could be a bipolar membrane which maintains the mechanical separation between the anion and cation exchange resins 20*a*, 24*a*, while allowing the hydrogen and hydroxyl ions to pass through the resin and membrane to the oppositely charged electrode. The bipolar interface 90 may also allow some decationized water to pass directly from the cation exchange resin chamber 20 to the anion exchange resin chamber 24 (indicated by the flow arrow 35) independent of the decationized water conveyed along the flow path 34.

FIG. 2 illustrates, in more detail, one preferred embodiment of an electrodeionization cell or vessel 14 that integrates the cathode chamber, cation exchange resin chamber, anion exchange resin chamber and anode chamber. The portions of the deionization cell 14 shown in FIG. 2 that correspond to the block diagram shown in FIG. 1 will be given the same reference character followed by an apostrophe. As seen in FIG. 2, the components of the cell 14 shown individually in FIG. 1 are all housed in a single vessel housing 100. The lower half of the vessel is a cation exchange portion 100*a* whereas the upper half of the vessel is an anion exchange portion 100*b*.

The cation exchange portion 100*a* includes the cation exchange resin chamber 20' which contains the cation resin 20*a*. The cation exchange resin chamber 20' is separated from the cathode chamber 50' by a cation exchange membrane 52'. Water to be treated enters the cation exchange resin chamber 20' via the inlet connection 30*a'*. In general, the water to be treated flows upwardly through the cation exchange resin 20*a* as indicated by the process flow arrow 110, from a region of completely or partially exhausted resin near the cation exchange membrane 52' to a region of highly regenerated resin near the bipolar interface 90'.

The anion exchange portion 100*b* of the cell 14 located in the upper half of the vessel includes the anion exchange resin chamber 24' and the anode chamber 60'. The anode chamber 60' is separated from the anion exchange resin chamber 24' via the anion exchange membrane 62'.

When the decationized water leaves the cation exchange resin chamber 20', it may either pass through the interface 90' which may be termed a bipolar interface and enter the anion exchange resin chamber 24' or it will exit the cation resin chamber 20' via conduit 34' and enter the anion resin chamber via conduit 34'. If the decationized water enters the anion resin chamber via 34', then the decationized water flows through the anion exchange resin 24*a* as indicated by the process flow arrow 114. The anions carried in the decationized water are held or captured in the anion exchange resin 24*a* and thus deionized water is discharged from the anion exchange resin chamber 24' via the outlet connection 38'.

A voltage potential is applied across the cathode 54' and anode 64' thus creating an electric field within the cell. This voltage potential may, or is preferably, less than 40 volts. In the bipolar interface region 90' between the cation exchange resin 20*a* and the anion exchange resin 24*a*, the electric field causes water in this region to disassociate into hydrogen and hydroxyl ions. The electric field maintained between the cathode 54' and anode 64' also causes cations removed by the cation exchange resin 20*a* to migrate towards the cathode 54'. This migration of cations or "cation flux" is indicated by the arrow 120.

The anions removed from the water flowing through the anion exchange resin chamber 24' are attracted to and tend to migrate towards the anode 64' and into the anode chamber 60'. The anion exchange membrane 62' allows this "anion flux," as indicated by the flow arrow 126, to flow into the anode chamber 60'. The ions that migrate into the cathode and anode chambers 50', 60' are flushed from the chambers by fluid communicated to the chambers via the respective inlets 56', 63' and are discharged through respective outlets 58', 68'. The membranes 52', 62' that separate the cathode and anode chambers 50', 60' from the respective cation exchange resin and anion exchange resin chambers 20', 24' substantially prevents the cross flow of water and flushing fluid between the chambers.

The hydrogen ions produced near the bipolar interface 90' are also attracted to the cathode 54'. As these hydrogen ions travel through the cation exchange resin 20*a* they tend to displace the captured cations from the cation exchange resin 20*a* so that they can flow into the electrode chamber 50'. In effect, these hydrogen ions "regenerate" the cation exchange resin 20*a*. This regeneration can occur both during the processing of water (as water flows through the vessel 14) and more importantly, occurs when water is not flowing through the vessel, i.e. when treated water is not being called for at the dispensing point or faucet 36 (shown in FIG. 1). In effect, the cation exchange resin 20*a* may be continuously regenerated.

Similarly, the hydroxyl ions produced near the bipolar interface 90' are attracted by and move towards the anode 64'. As the hydroxyl ions pass through the anion exchange resin 24*a*, they tend to replace anions such as sulfate or chloride ions from the resin so that these undesirable ions are free to flow into the anode chamber 60' where they are removed by the flushing fluid communicated to the anode chamber 60'. In the disclosed embodiment, it is believed that the anion exchange resin 24*a* is continuously regenerated by the hydroxyl ions produced in the zone of water disassociation 90' in the same or in substantially the same manner described above in connection with the cation resin 20*a*.

The cation and anion exchange resin chambers 20 and 24 respectively, are sized to have sufficient capacity for intermittent periods of high product water flow and usage. This allows the deionization cell 14 to deionize water during higher than normal usage or usage during a power outage. The deionization cell 14 is also capable of electroregeneration without producing product water due to the separate flushing streams through the cathode and anode chambers 50' and 60' respectively. The chambers 20, 24 are preferably at least one inch thick. The cell 14 preferably produces treated water that is less than one grain per gallon hard.

As seen in FIG. 2, the vessel may include optional third electrodes 140 which can be used to control the pH of the water in the anion exchange resin chamber 24' or in the cation exchange chamber 20'. By controlling the pH of the water, scaling and/or precipitation in the chambers can be eliminated or substantially reduced, while producing product water that is not corrosive.

Figure 3:
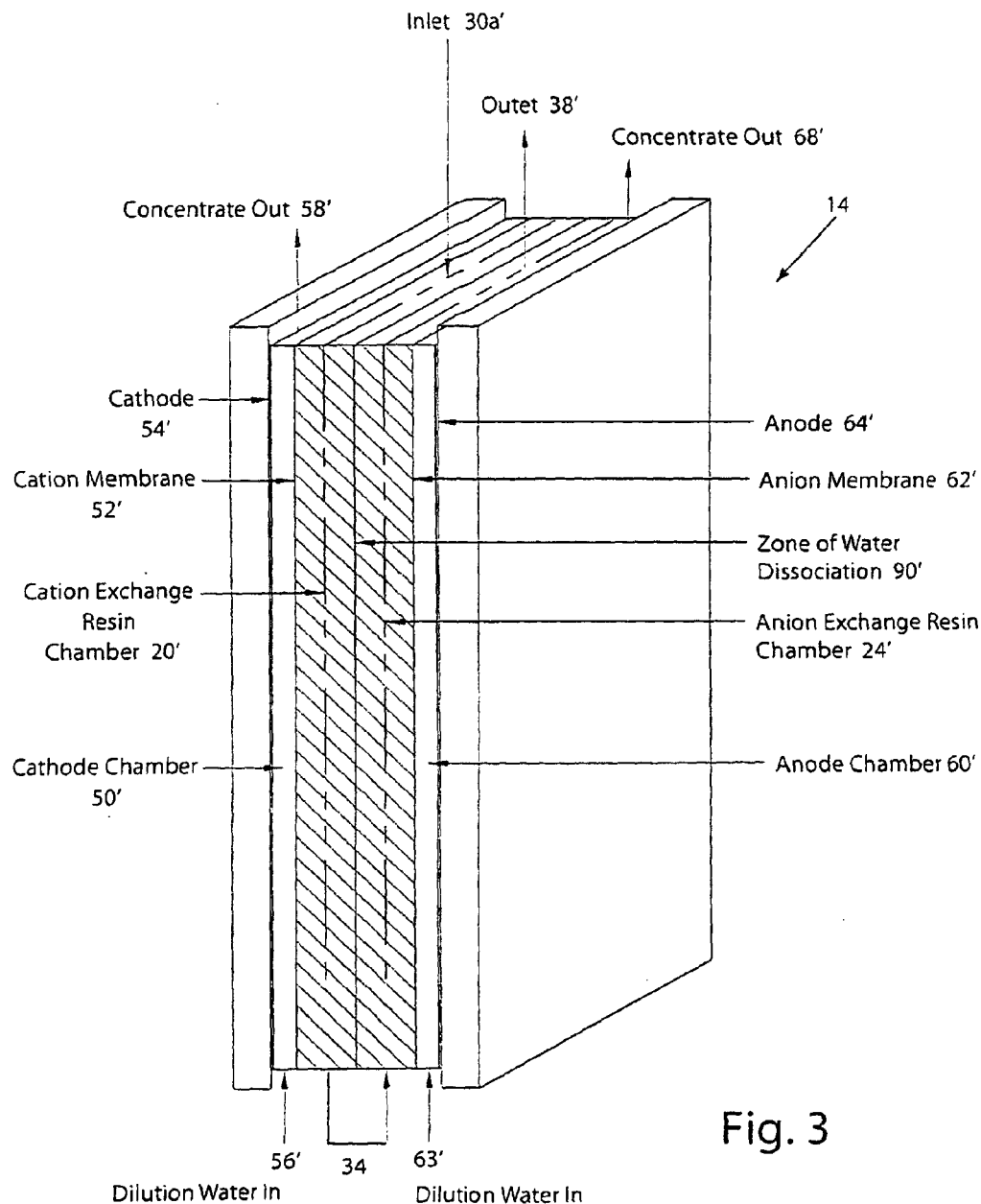
FIG. 3 is a sectional view, shown somewhat schematically, of an electroregeneration water treatment device constructed in accordance with a preferred embodiment of the invention commonly known as the plate and frame design.
Figure 4:
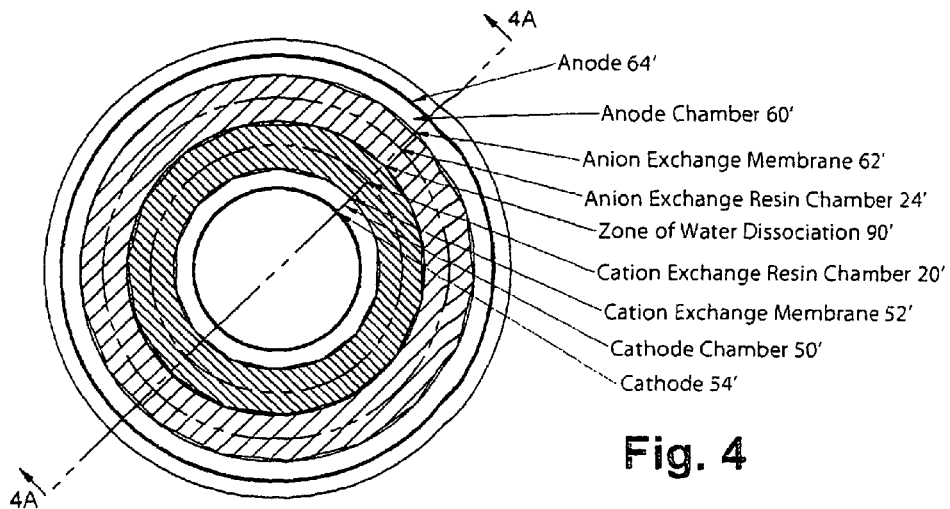
FIG. 4 shows the components used to construct an electroregeneration water treatment device in accordance with one preferred embodiment of the invention commonly referred as the annular design.

FIGS. 3 and 4 illustrate actual implementations of the cell 14 illustrated schematically in FIG. 2. Turning first to FIG. 3, the cell 14 is implemented in a plate and frame configuration. For purposes of explanation, components shown in FIG. 3 that are the same as the components shown in FIG. 2 are indicated by the same reference character. It should be noted, that the flowpath 34 illustrated in FIG. 3 corresponds to the flowpath 34 shown in FIG. 1. With this preferred design, only one anion chamber and one cation chamber are needed in a given cell to produce sufficient quantities of treated water. This is unlike the prior art which required multiple cation and anion chambers (or mixed bed resin chambers) in order to provide sufficient treatment capacity. It is believed, that the improved efficiency that is provided by the design shown in FIG. 2 and as implemented in FIG. 3, is due to the use of the zone of water dissociation 90' and in particular to the use of the bipolar interface shown schematically in FIG. 1 and indicated by the reference character 90.

Figure 4A:
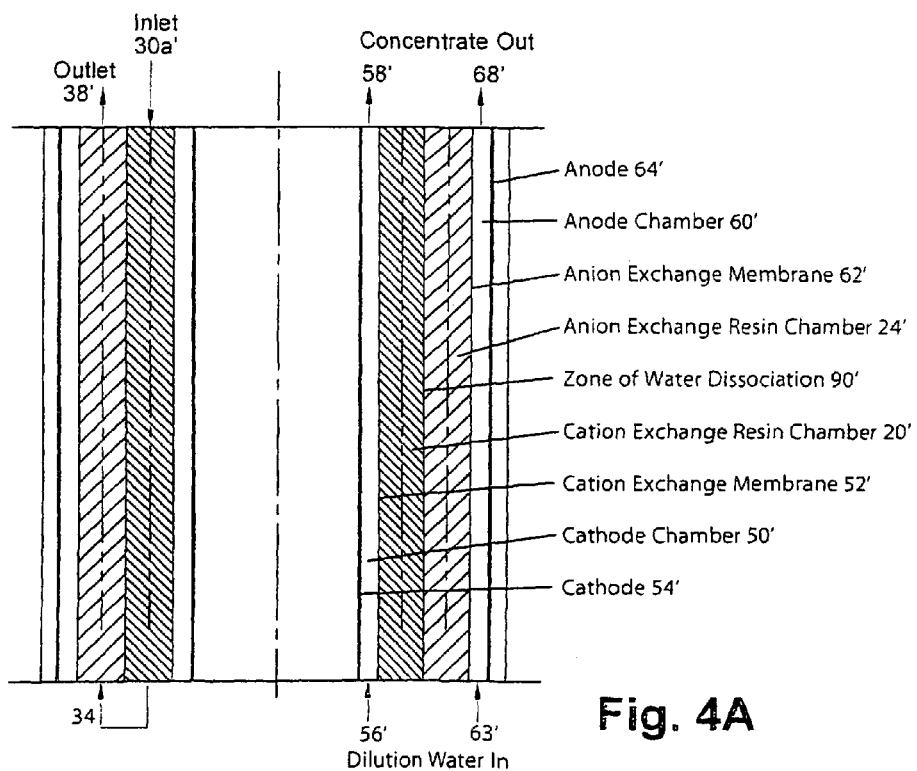
FIG. 4A is a sectional view of the apparatus shown in FIG. 4 as seen from the plane indicated by the line 4A-4A.

FIGS. 4 and 4A illustrate another implementation of the cell 14 shown schematically in FIG. 2. The apparatus shown in FIG. 4 is substantially similar to that shown in FIG. 3 except that cell is configured as an annular structure in which the plate-like layers shown in FIG. 3 are replaced with cylindrical interfitting layers. Again to simplify the explanation, the components shown in FIGS. 4 and 4a that are the same as those shown in FIG. 2 are indicated with the same reference characters. It should also be noted, that the flowpath 34 shown in FIG. 4A corresponds to the flowpath 34 shown in FIG. 1.

Figure 5A:
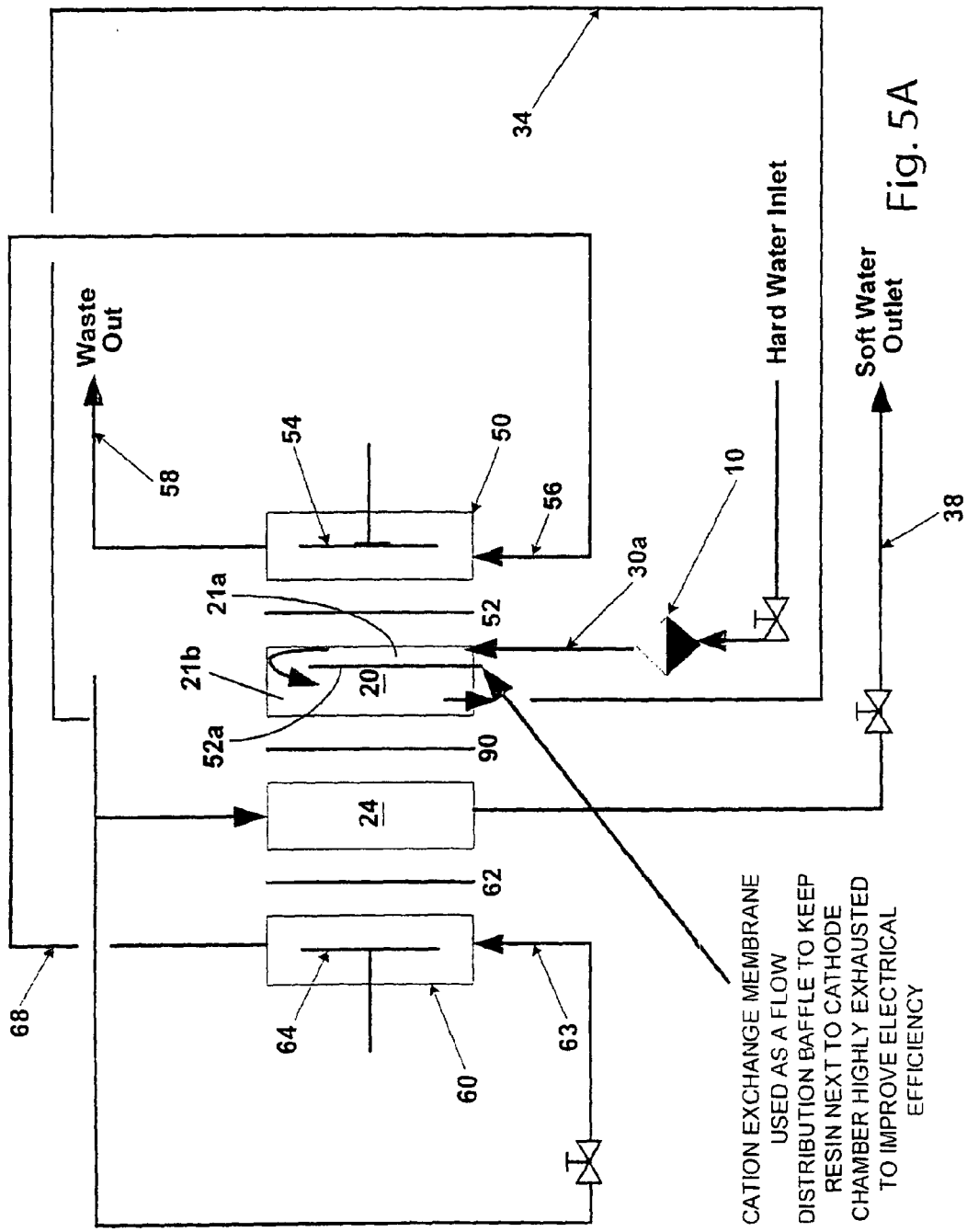
FIG. 5A is schematic representation of a water treatment system constructed in accordance with another preferred embodiment of the invention.

FIG. 5A illustrates another embodiment of the invention. The system shown in FIG. 5A is shown schematically and for purposes of explanation, components in FIG. 5A that are identical or substantially identical to components shown in FIG. 1 are given the same reference characters. It should be noted that in the FIG. 1 configuration, the cations removed from the treated water move downwardly towards the cathode chamber, through the cation exchange membrane 52. This movement is indicated by the vertical arrow. Similarly, the water being treated moves generally vertically through the cation exchange resin chamber towards the bipolar junction 90 in FIG. 1. In other words, the movement of the water being treated and the flow of cations are generally parallel.

In some designs, the flow of water to be treated is transverse or perpendicular to the flow of electric current. i.e., the flow of cations. This flow relationship is illustrated in FIG. 5A. With this configuration, a baffle 52a is employed. In the preferred embodiment, the baffle 52a is another cation exchange membrane. The placement of the cation exchange membrane 52a in the canion exchange chamber creates a region of highly exhausted resin next to the cathode chamber 50. The baffle 52a confines and directs the flow of water entering the cation exchange resin chamber 20 to flow initially through the highly exhausted resin 21a before flowing around the baffle 52a and entering more highly regenerated resin region 21b. Although the baffle 52a defines a flowpath for the water entering the chamber, the cations themselves removed from the water can flow across the baffle 52a towards the cathode 54. This configuration improves the efficiency of the apparatus because it maintains a significant quantity of highly exhausted resin near the cathode so that a significant portion of the regenerating current flow is through the highly exhausted resin.

FIG. 5B illustrates the flow pattern and relationship between the cation membrane 52 and the cation chamber 20. As seen in FIG. 5B, water to be treated enters the chamber 20 via inlet 30a. The baffle 52a which preferably comprises a cation membrane forces the incoming water to flow through the highly exhausted resin which is immediately adjacent the cation membrane (CM) 52a and hence the cathode 54. After passing through the highly exhausted resin region 21a, the flow of water is diverted into the highly regenerated resin region 21b and is eventually discharged and the resulting decationized water is discharged through the outlet 34.

FIG. 5C illustrates the flow/resin relationship when the baffle 52a is not used. As seen in FIG. 5C, water to be treated enters at one end of the cell and flows in a direction substantially parallel to the cathode membrane 52. As a result of the flow pattern, highly exhausted resin is formed near the chamber inlet. In fact, a gradient may be formed where the resin varies from highly exhausted resin at the inlet to highly regenerated resin at the outlet. Since the current flow from the cathode membrane 52 is transverse to the water flow, a significant portion of the current flows through highly regenerated resin where it is not needed. This results in inefficient use of the cathode current.

The baffle cell design described above is advantageous when the flow of water is transverse or perpendicular to the flow of electric current as is the case, for example, in the plate and frame design shown in FIG. 3. The use of the flow baffle forces the ions to enter the ion exchange resin chamber at a point close to where they will exit through the ion exchange membrane. The ions, therefore, have less distance to travel in order exit the chamber when the baffle design is utilized. Additionally, resins of different ionic forms have different conductivities, such that the regenerated form of both strong acid cations and strong base anion resins are more conductive than the exhausted form of each resin. Without the flow baffle, there would be regions of exhausted and regenerated resins in a continuous electrical path through the cation and anion exchange resin chambers. If not compensated for by the flow directing baffle 52a, which is also importantly not a barrier to ion transport or electrical conductance, most of the current would pass through the already regenerated resin and be wasted in the sense that the majority of the current would not regenerate the exhausted resin as is desired. When the ion exchange resin chambers are 25-50% or more exhausted, the baffle 52a creates a plane of exhausted resin across the entire cross-section of the cell and forces current in the form of hydrogen ion migration to pass through the exhausted resin, thereby regenerating it. This balances out the flow of electrical current at the top, middle and bottom of the chamber and improves the electrical efficiency.

When the flow of water is parallel to the flow of electrical current, as is the case in FIG. 2, and the water enters the ion exchange resin chambers near the cation and the anion exchange membrane and moves in a direction toward the bipolar junction 90', there is no need for a baffle to redirect the flow, or to balance out the flow of electrical current in different regions of the chamber. In the FIG. 2 configuration, the flow of water and the migration of the ions are counter-current or in opposite directions to each other, and a natural gradient is formed of highly exhausted resin next to the cation and anion exchange membranes to highly regenerated resin next to the bipolar junction 90'.

Example I

The effectiveness of an electroregeneration ion removing cell of the present invention was evaluated using a test cell at a scale of 1:200 of the desired size. Results of the test are presented in Table 1.

TABLE 1

Inlet Water Source: Cell configuration

| | | Time | | | | | | |
|---|---|---|---|---|---|---|---|---|
| | | 10.00 | 10.15 | 13.30 | 15.35 | 16.30 | 7.45 | 8.15 |
| Amperage (mA) | | 35 | 35 | 35 | 35 | 35 | 35 | 35 |
| Voltage (V) | V0-V1 | 6.1 | 6.08 | 5.95 | 5.83 | 5.76 | 6.15 | 6.14 |
| post anion resin | Conductivity (μS/cm) | 138.2 | 65.7 | 16.7 | 9.4 | 6.9 | 15.8 | 18.4 |
| | PH | 9.1 | 8.84 | 8.1 | 8.18 | 8.48 | 4.51 | 4.42 |
| | T (° C.) | 21.7 | 21.9 | 21.5 | 21.9 | 22.2 | 18.1 | |
| post cathode chamber | Conductivity (μS/cm) | | | 1060 | 1068 | 1067 | 1298 | 1310 |
| | PH | | | 3 | 2.98 | 2.96 | 2.81 | 2.87 |
| | T (° C.) | | | 22.2 | 22 | 22.5 | 18.6 | 18.9 |
| Flow Rates | Product (ml/min) | 2.6 | | 2.6 | 2.6 | 2.6 | 2.6 | 2.6 |

Hard Water (300-320 mg/L) of hardness as Calcium Carbonate)
upflow thru cation resin, then up thru anion resin, bipolar membrane As seen in Table 1, a relative low voltage drop of 6 volts was maintained while producing water in the desired range of conductivity and the waste water leaving the cathode chamber is indicative of the ions moving in the manner as shown in FIG. 2. The third electrode was not used in this example but it is believed that a desirable pH can be obtained by using such.

Figure 6:
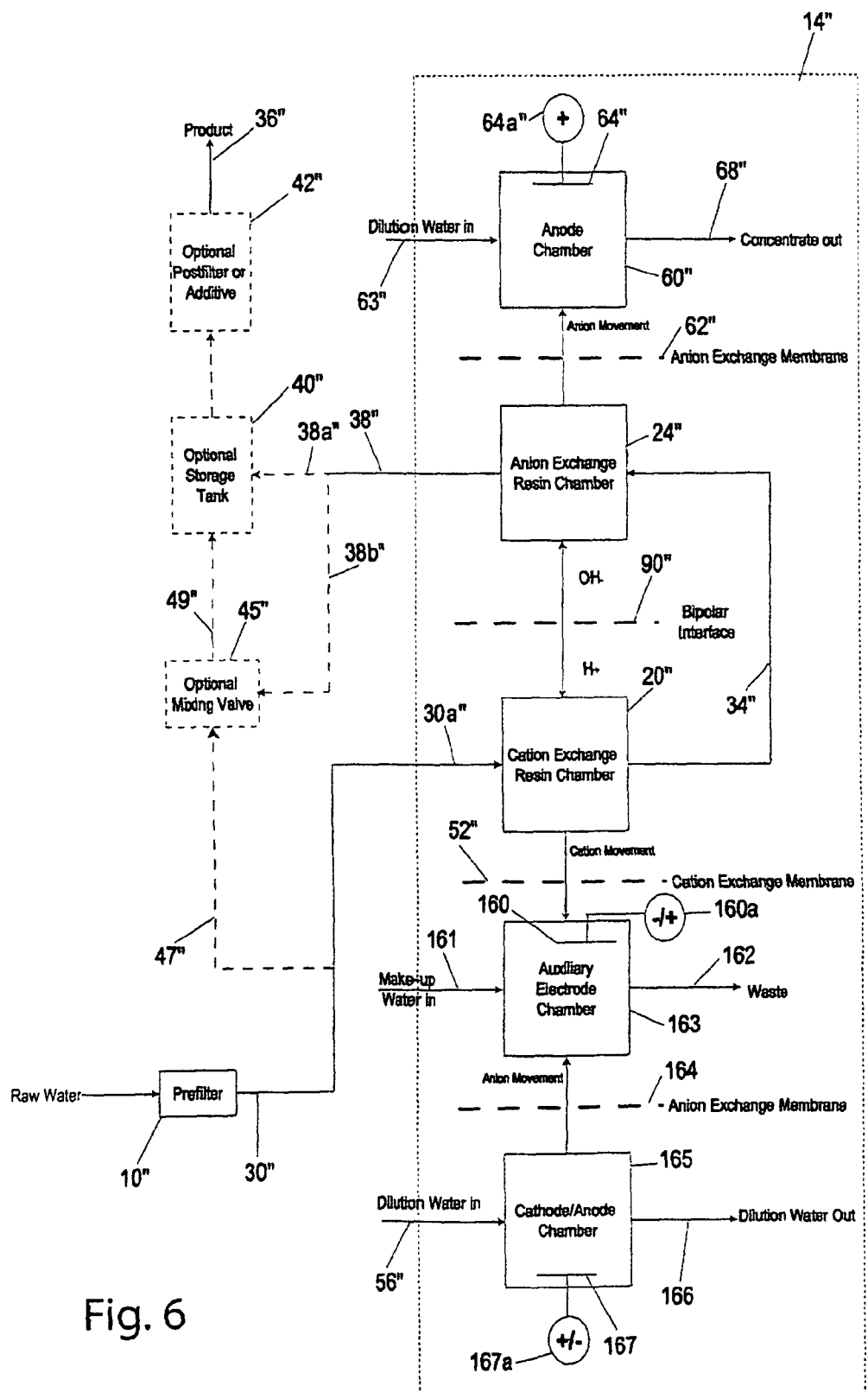

FIG. 6 schematically illustrates another embodiment of a water treatment system for removing hard and other ions from a water supply. In the illustrated embodiment, the water to be treated (or raw water) is first fed through a prefilter 10" to remove chlorine, organic molecules and particulates carried by the water. From the prefilter, the water to be treated is conveyed to an electroregeneration deionization cell or vessel indicated by the phantom line 14". The cell 14" includes a cation exchange resin chamber 20" and an anion exchange resin chamber 24" through which the raw water is passed. Referring also to FIG. 2, a cation exchange resin 20a (only shown in FIG. 2) and an anion exchange resin 24a contained within the chambers 20", 24", respectively operate to remove some or all of the cations and anions carried by the raw water.

Referring in particular to FIG. 6, filtered raw water is communicated to an inlet of the cation exchange resin chamber 20" via conduit or flow path 30" and branch conduit 30a". As the water flows through the cation exchange resin chamber 20", cations carried by the water such as calcium and magnesium are attracted to, and held within the chamber 20" by the cation exchange resin 20a (shown in FIG. 2). From the resin chamber 20", the decationized water flows to the anion exchange resin chamber 24" via conduit or flow path 34". Alternately, some or all of the decationized water may flow into another chamber or reservoir (as will be further described). As the decationized water flows through the anion exchange resin chamber 24", the anion resin 24a (shown in FIG. 2) within the chamber 24" attracts anions such as sulfates, chlorides, etc. and removes them from the water traveling through the resin chamber 24". The resulting "deionized" water is then conveyed to a delivery point such as a faucet indicated generally by the reference character 36" via conduit or flow path 38". The flow path 38" may optionally include a conduit 38a" to a storage tank 40" for accumulating purified water and/or a post treatment device 42", or a flow conduit 38b" to a mixing valve 45" to mix filtered raw water 47" with the treated water 38". The post treatment device 42" may comprise a post filter such as a carbon filter or a device for adding minerals or chemicals such as fluoride to the deionized water prior to dispensing.

The cation exchange resin chamber 20" is separated from an auxiliary electrode chamber 163 by way of a cation exchange membrane 52" which in the preferred embodiment separates the cation exchange resin chamber 20" from the auxiliary electrode chamber 163.

The auxiliary electrode chamber 163 houses an auxiliary electrode 160 which by means of a switching device (not shown) can be connected to either the positive terminal or to the negative terminal of a direct electric current source 160a. The auxiliary electrode chamber 163 is separated from the cathode/anode chamber 165 by an anion exchange membrane 164 which may have the identical construction as anion exchange membrane 62". Make-up water flows into the auxiliary chamber 163 through conduit 161, and exits as waste through conduit 162. There can be various sources of the make-up water in conduit 161, and in the preferred embodiment the source of this water is the dilution water that is leaving the Cathode/Anode chamber 165 in conduit 166. During normal operation, cations pass into the auxiliary electrode chamber 163 through cation exchange membrane 52", and anions pass into the auxiliary electrode chamber through anion exchange membrane 164. These ions exit the auxiliary electrode chamber as waste through conduit 162.

The cathode/anode chamber 165 houses an electrode 167 which by means of a switching device (not shown) can be connected either to the negative terminal or to the positive terminal of a direct electrical current power source 167a. Dilution water flows through the cathode/anode chamber 165 from an inlet indicated generally by the reference character 56" and flows to an outlet conduit 166. In the illustrated embodiment, the dilution water may be decationized water from conduit 34" and may be recirculated by means of a pump (not shown) from a reservoir (not shown) through both the anode chamber 60" and the cathode/anode chamber 165.

The anion exchange resin chamber is separated from an anodic electrode chamber 60" via an anion exchange membrane 62". The anode chamber contains an anode 64" connected to a positive terminal of a direct electrical current power source 64"a and may at times be de-energized by means of a switching device (not shown). Dilution water is also conveyed to the anode chamber 60" through the connected conduit or flow path 63" The dilution water enters the anode chamber via a conduit 63" and leaves the anode chamber 60" and is communicated to the cathode/anode chamber 165 through conduits 68" and 56".

In the preferred and illustrated embodiment, the cation exchange resin chamber 20" and the anion exchange resin chamber 24" are in adjacent fluid communication. According to the illustrated embodiment, an interface between the anion resin chamber and cation resin chamber, indicated generally by the reference character 90" is a bipolar interface operative to split water at the interface into hydrogen and hydroxyl ions as illustrated schematically in FIG. 1.

The hydrogen ions and the hydroxide ions produced in the zone of water disassociation 90" move as described previously in the descriptions for FIG. 1 and FIG. 2, except that when configured as shown in FIG. 6, anions also flow from the cathode/anode chamber 165 to the auxiliary electrode chamber 163 through anion exchange membrane 164.

When arranged as shown in FIG. 6, the auxiliary electrode 160 can be operated intermittently with the cathode/anode 167 in the cathode/anode chamber 165 to create a de-scaling or cleaning cycle for either the auxiliary electrode chamber 163 or the cathode/anode chamber 165 in the following manner. In the first case, during the normal operation cycle, only the primary anode 64" and the primary cathode 167 are energized and the auxiliary electrode 160 is not energized. During the service cycle, the bipolar junction 90" is actively splitting water into H+ and OH– ions which regenerate the cation ion exchange media in the cation exchange chamber 20" and the anion exchange media in the anion exchange chamber 24", respectively, and the ions also move toward the oppositely charged electrodes under the applied electric field. During a de-scaling cycle, which is preferably done frequently enough to prevent any significant hardness scaling on membrane, resin or electrode surfaces, the primary anode 64" is de-energized and the auxiliary electrode 160 is energized as an anode by means of a switching device.

In order to lower the pH of the auxiliary electrode chamber 163 and thereby prevent scaling or to de-scale the auxiliary electrode chamber, the auxiliary electrode 160 is energized as an anode, and the primary cathode 167 continues to function as a cathode. At the auxiliary electrode, oxygen gas and H+ ions are formed due to the electrolysis of water by the following equation, where e⁻ represents a negatively charged electron.

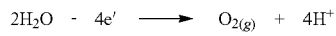

$$2H_2O - 4e^- \longrightarrow O_{2(g)} + 4H^+$$

Anode Reaction     Products Released to Solution

The hydrogen ions generated from this reaction reduce the pH of the water in the auxiliary electrode chamber 163, and thereby dissolve any scale that has formed. In order to make this pH change occur rapidly, it is also desirable to reduce or stop the flow of water through the auxiliary electrode chamber 163 when the electrode 160 is energized as an anode.

In order to de-scale the cathode/anode chamber 165, the auxiliary electrode 160 is energized as a cathode and the primary cathode 167 is temporarily energized as an anode by means of a switching device. In this way the pH of the water in the cathode/anode chamber 165 is lowered by the H⁺ ions generated by the above reaction and the primary cathode chamber is de-scaled. The electric field resulting from this operation also results in lowering the pH of the anion membrane surface 164 on the side facing the auxiliary electrode chamber 163, thereby dissolving or separating any scale that may form at this surface.

During either of the de-scaling cycles described above, the primary anode 64" is not energized and there is no electrical potential across the bipolar junction 90". Accordingly, there is no water splitting or regeneration of the cation exchange media in the cation exchange resin chamber 20" and no regeneration of the anion exchange media in the anion exchange resin chamber 24" during the de-scaling cycles as described above. Since regeneration of the ion exchange media does not occur during the de-scale cycles, it is desirable that the de-scale time interval be as short as possible in relation to the normal service cycle. Cycle times for the normal service cycle and one or more de-scale cycles may be variable and may also be combined with changes to the flow rates through the electrode chambers, and/or changes to the applied current.

TABLE 2

| | | FIG. 6 Reference Number | | |
| | | 64" (Primary Anode) | 160 (Auxiliary Electrode) | 167 Primary Cathode |
| Cycle | Description | | | |
|---|---|---|---|---|
| A | Normal Service Cycle 1 | + | OFF | − |
| B | Normal Service Cycle 2 | + | − | OFF |
| C | Auxiliary Electrode (160) Cleaning | OFF | + | − |
| D | Anion Exchange Membrane (164) Cleaning | OFF | − | + |

Table 2 describes several cycles that can be implemented with the apparatus show in FIG. 6. There are at least two possible service cycles which are identified as Cycle A and B. In Service Cycle A, the primary anode 64" is energized with a positive voltage, the auxiliary electrode 160 is de-energized and the cathode/anode 167 is given a negative potential. According to the preferred embodiment, the apparatus of FIG. 6 will use Cycle A as its normal service cycle to produce softened water. In other applications, depending on factors such as the quality of the incoming water, Cycle B may be chosen as the normal service cycle. In Cycle B, a positive voltage is applied to the anode 64", a negative voltage is applied to the auxiliary electrode 160 and the cathode/anode 167 is de-energized.

It is believed that for many, if not most applications, short cleaning cycles will have to be implemented to de-scale the auxiliary electrode 160/electrode chamber 163 and/or the anion exchange membrane 164. To de-scale the auxiliary electrode, Cycle C is implemented. In Cycle C, the primary anode 64" is de-energized and the auxiliary electrode is positively charged and the cathode/anode 167 is negatively charged. The length of the cleaning cycle in C should be relatively short but of sufficient time to dissolve and flush away any scale in the auxiliary electrode chamber 160. If the anion exchange membrane 164 also needs cleaning, Cycle D is then implemented. In Cycle D, the primary anode 64" is de-energized and the auxiliary electrode 160 is negatively charged, whereas the cathode/anode 167 is positively charged. It is believed that cleaning Cycle D should be relatively short but of sufficient time to allow the scale to be dissolved and flushed from the anion exchange membrane 164.

It should be understood here, however, that the invention contemplates various sequences of the cycles shown in Table 2. For some applications, both Cycle A and B may be implemented depending on operating conditions. In some systems, both cleaning Cycles C and D may not be required. The length and frequency of the cleaning cycles is also dependent on the specific application and the quality of incoming water at the application site.

Example II

TABLE 3

| Analysis | Feed Water | 02/25-02/26 Waste Composite | 02/26-02/27 Waste Composite | 02/27-02/28 Waste Composite | 02/26-02/27 Product Composite | 02/27-02/27 Product Composite | 02/27-02/28 Product Composite |
|---|---|---|---|---|---|---|---|
| pH | 7.22 | 7.07 | 7.49 | 7.91 | 9.36 | 9.34 | 9.45 |
| Conductivity µS/cm | 622 | 3,083 | 2,170 | 1,724 | 45 | 52 | 54 |
| Chloride mg/L as Cl | 32.8 | 127.4 | 200.9 | 181.3 | <1 | <1 | <1 |
| Sulfate mg/L as $SO_4$ | 45 | 1,288 | 650 | 365 | <4 | <4 | <4 |
| Sodium mg/L as Na | 12 | 675 | 370 | 185 | 11 | 12 | 13 |
| Potassium mg/L as K | 2 | 9 | 10 | 8 | <1 | <1 | 1 |
| Calcium mg/L as Ca | 83.25 | 64.5 | 74.0 | 122.0 | <0.02 | <0.02 | <0.02 |
| Magnesium mg/L as Mg | 21.5 | 29.0 | 79.0 | 68.0 | <0.01 | <0.01 | <0.01 |
| Total Hardness mg/L as $CaCO_3$ | 295.4 | 279.5 | 508.2 | 582.6 | <0.1 | <0.1 | <0.1 |
| Silicon mg/L as Si | 6.7 | 3.5 | 10.2 | 19.6 | 1.7 | <1 | <1 |
| Iron mg/L as Fe | <0.03 | <0.03 | <0.03 | <0.03 | <0.03 | <0.03 | <0.03 |
| p-Alkalinity mg/L as $CaCO_3$ | 0.0 | 0.0 | 0.0 | 0.0 | 4.0 | 4.0 | 4.0 |
| m-Alkalinity mg/L as $CaCO_3$ | 247.4 | 80.0 | 284.0 | 404.0 | 24.0 | 30.0 | 32.0 |

The effectiveness of an electroregeneration ion removing cell constructed in accordance with FIG. 6, was evaluated using a test cell. The results of the test are presented in Table 3. From Table 3, it can be seen that during the four day test (Feb. 25, 2008-Feb. 28, 2008), the hardness of the incoming water was reduced from 295.4 mg/L as $CaCO_3$ to less than 0.1. The table also indicates that other ions were also removed. The resulting softened water with reduced ionic content was produced using a test cell constructed in accordance with FIG. 6 and operated at relatively low voltages as compared to commercial EDI systems.

While the description above lists only two of the many ways that an auxiliary electrode in an auxiliary electrode chamber can be beneficially cycled, these descriptions are not intended to limit the scope of this invention regarding the ways that this feature can be used, only as two examples of the many different ways which are part of this invention. For example, in another variation of this invention, the auxiliary electrode may function as a primary cathode with the cathode/anode de-energized during normal service without departing from the spirit of this invention.

Although the invention has been described with a certain degree of particularity, it should be understood that those skilled in the art can make various changes to it without departing from the spirit or scope of the invention as hereinafter claimed.

The invention claimed is:

1. A method of producing demineralized water comprising:
   a) providing an apparatus comprising;
      i) a cation exchange chamber containing a cation exchange media;
      ii) an anion exchange chamber containing an anion exchange media;
      iii) a bipolar interface located between said cation exchange chamber and said anion exchange chamber;
      iv) a first electrode chamber located on a side of said cation exchange chamber opposite said bipolar interface, and containing a first electrode operative at least as a cathode;
      v) a second electrode chamber located on a side of said anion exchange chamber opposite said bipolar interface, and containing a second electrode operative at least as an anode; and,
      vi) a third electrode disposed in at least one of said anion exchange chamber and said cation exchange chamber;
   b) configuring said apparatus to receive filtered raw water having a hardness of at least 75 mg/L as $CaCO_3$;
   c) causing said first and second electrodes to be energized during a period of no water flow to at least partially regenerate said ion exchange media, and sizing said ion exchange chambers such that said apparatus is capable of providing at least about 700 liters of demineralized water containing less than 75 mg/L hardness as $CaCO_3$ from said raw water having a hardness of at least 75 mg/L as $CaCO_3$ over about 24 hours;

d) causing said filtered raw water to flow through said cation exchange chamber and said anion exchange chamber to produce said demineralized water; and, e) periodically reducing the pH in said first electrode chamber to at least partially dissolve hardness scale therein.

2. The method of claim 1, comprising continuously energizing said first and second electrodes during periods of no water flow.

3. The method of claim 1, wherein said first and second electrodes are energized at less than 40 volts.

4. The method of claim 1, wherein at least one of said ion exchange chambers is sized to at least 1 inch thick.

5. The method of claim 1, wherein each said ion exchange chambers are sized to at least 1 inch thick.

6. The method of claim 1 comprising providing said cation exchange chamber with a baffle within said chamber configured to direct water flowing into said chamber to flow initially through a more highly exhausted region of said cation exchange media before entering a more highly regenerated region of said cation exchange media.

7. The method of claim 6, wherein said baffle comprises a cation exchange membrane.

8. The method of claim 1 comprising energizing said third electrode as a cathode and said first electrode as an anode for a time sufficient to reduce scale in said first electrode chamber.

9. The method of claim 1 comprising energizing said third electrode as a cathode and said second electrode as an anode for a time sufficient to reduce scale in said second electrode chamber.

10. The method of claim 1 wherein said method produces at least about 700 liters of demineralized water having less than about one grain per gallon hardness as $CaCO_3$ over about 24 hours.

11. The method of claim 1 wherein said method produces at least about 700 liters of demineralized water having less than about 0.1 mg/L hardness as $CaCO_3$ over about 24 hours.

12. A method of producing demineralized water comprising:
a) providing an apparatus comprising;
  i) a cation exchange chamber containing a cation exchange media;
  ii) an anion exchange chamber containing an anion exchange media;
  iii) a bipolar interface located between said cation exchange chamber and said anion exchange chamber;
  iv) a first electrode chamber located on a side of said cation exchange chamber opposite said bipolar interface, and containing a first electrode operative at least as a cathode;
  v) a second electrode chamber located on a side of said anion exchange chamber opposite said bipolar interface, and containing a second electrode operative at least as an anode; and,
  vi) a third electrode chamber interposed between said first electrode chamber and said cation exchange chamber and containing a third electrode, said third electrode chamber bounded on a side proximal said second electrode chamber with a cation exchange membrane and on a side proximal said first electrode chamber with an anion exchange membrane;

b) configuring said apparatus to receive filtered raw water having a hardness of at least 75 mg/L as $CaCO_3$;

c) causing said first and second electrodes to be energized during a period of no water flow to at least partially regenerate said ion exchange media, and sizing said ion exchange chambers such that said apparatus is capable of providing at least about 700 liters of demineralized water containing less than 75 mg/L hardness as $CaCO_3$ from said raw water having a hardness of at least 75 mg/L as $CaCO_3$ over about 24 hours;

d) causing said filtered raw water to flow through said cation exchange chamber and said anion exchange chamber to produce said demineralized water; and, e) periodically reducing the pH in said first electrode chamber to at least partially dissolve hardness scale therein.

13. The method of claim 12, comprising continuously energizing said first and second electrodes during periods of no water flow.

14. The method of claim 12, wherein said first and second electrodes are energized at less than 40 volts.

15. The method of claim 12, wherein at least one of said ion exchange chambers is sized to at least 1 inch thick.

16. The method of claim 12, wherein each said ion exchange chambers are sized to at least 1 inch thick.

17. The method of 12 comprising providing said cation exchange chamber with a baffle within said chamber configured to direct water flowing into said chamber to flow initially through a more highly exhausted region of said cation exchange media before entering a more highly regenerated region of said cation exchange media.

18. The method of claim 17, wherein said baffle comprises a cation exchange membrane.

19. The method of claim 12 comprising energizing said third electrode as a cathode and said first electrode as an anode for a time sufficient to reduce scale in said first electrode chamber.

20. The method of claim 12 comprising energizing said third electrode as an anode and said first electrode as a cathode for a time sufficient to reduce scale in said third electrode chamber.

21. The method of claim 12 wherein said third electrode chamber and said cation exchange chamber are contiguous and separated by a common cation exchange membrane, and said third electrode chamber and said first electrode chamber are contiguous and separated by a common anion exchange membrane.

22. The method of 12 wherein said method produces at least about 700 liters of demineralized water having less than about one grain per gallon hardness as $CaCO_3$ over about 24 hours.

23. The method of claim 12 wherein said method produces at least about 700 liters of demineralized water having less than 0.1 mg/L hardness as $CaCO_3$ over about 24 hours.

24. A method of producing demineralized water comprising:
a) providing an apparatus comprising;
  i) a cation exchange chamber containing a cation exchange media;
  ii) an anion exchange chamber containing an anion exchange media;
  iii) a bipolar interface located between said cation exchange chamber and said anion exchange chamber;
  iv) a first electrode chamber located on a side of said cation exchange chamber opposite said bipolar interface, and containing a first electrode operative at least as a cathode;

v) a second electrode chamber located on a side of said anion exchange chamber opposite said bipolar interface, and containing a second electrode operative at least as an anode; and, vi) a third electrode chamber interposed between said second electrode chamber and said anion exchange chamber, and containing a third electrode, said third electrode chamber bounded on a side proximal said second electrode chamber with a cation exchange membrane and on a side proximal said first electrode chamber with an anion exchange membrane;

b) configuring said apparatus to receive filtered raw water having a hardness of at least 75 mg/L as $CaCO_3$;

c) causing said first and second electrodes to be energized during a period of no water flow to at least partially regenerate said ion exchange media, and sizing said ion exchange chambers such that said apparatus is capable of providing at least about 700 liters of demineralized water containing less than 75 mg/L hardness as $CaCO_3$ from said raw water having a hardness of at least 75 mg/L as $CaCO_3$ over about 24 hours;

d) causing said filtered raw water to flow through said cation exchange chamber and said anion exchange chamber to produce said demineralized water; and, e) periodically reducing the pH in said first electrode chamber to at least partially dissolve hardness scale therein.

25. The method of claim 24, comprising continuously energizing said first and second electrodes during periods of no water flow.

26. The method of claim 24, wherein said first and second electrodes are energized at less than 40 volts.

27. The method of claim 24, wherein at least one of said ion exchange chambers is sized to at least 1 inch thick.

28. The method of claim 24, wherein each said ion exchange chambers are sized to at least 1 inch thick.

29. The method of 24 comprising providing said cation exchange chamber with a baffle within said chamber configured to direct water flowing into said chamber to flow initially through a more highly exhausted region of said cation exchange media before entering a more highly regenerated region of said cation exchange media.

30. The method of claim 29, wherein said baffle comprises a cation exchange membrane.

31. The method of claim 24 comprising energizing said third electrode as an anode and said second electrode as a cathode for a time sufficient to reduce scale in said third electrode chamber.

32. The method of claim 24 comprising energizing said third electrode as a cathode and said second electrode as an anode for a time sufficient to reduce scale in said second electrode chamber.

33. The method of claim 24 wherein said method produces at least about 700 liters of demineralized water having less than about one grain per gallon hardness as $CaCO_3$ over about 24 hours.

34. The method of claim 24 wherein said method produces at least about 700 liters of demineralized water having less than about 0.1 mg/L hardness as $CaCO_3$ over about 24 hours.

* * * * *

UNITED STATES PATENT AND TRADEMARK OFFICE
CERTIFICATE OF CORRECTION

PATENT NO. : 8,337,686 B2  
APPLICATION NO. : 12/445848  
DATED : December 25, 2012  
INVENTOR(S) : David F. Rath et al.

Page 1 of 1

It is certified that error appears in the above-identified patent and that said Letters Patent is hereby corrected as shown below:

Title Page, Item (73), should read --Assignee: Tangent Company LLC, Chagrin Falls, OH (US)--

Signed and Sealed this
Fourth Day of June, 2013

Teresa Stanek Rea
*Acting Director of the United States Patent and Trademark Office*